(12) United States Patent
Hellegouarch et al.

(10) Patent No.: US 11,614,033 B2
(45) Date of Patent: Mar. 28, 2023

(54) ENGINE ASSEMBLY FOR AN AIRCRAFT HAVING AN AIR-OIL EXCHANGER SYSTEM SUPPORT WITH OPTIMIZED ATTACHMENT

(71) Applicant: SAFRAN AIRCRAFT ENGINES, Paris (FR)

(72) Inventors: Antoine Elie Hellegouarch, Moissy-Cramayel (FR); Marc Patrick Tesniere, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 152 days.

(21) Appl. No.: 17/294,577

(22) PCT Filed: Nov. 19, 2019

(86) PCT No.: PCT/FR2019/052743
§ 371 (c)(1),
(2) Date: May 17, 2021

(87) PCT Pub. No.: WO2020/115382
PCT Pub. Date: Jun. 11, 2020

(65) Prior Publication Data
US 2022/0010728 A1    Jan. 13, 2022

(30) Foreign Application Priority Data

Dec. 3, 2018 (FR) ...................................... 18 72249

(51) Int. Cl.
*F02C 7/14* (2006.01)
*F01D 25/18* (2006.01)
(Continued)

(52) U.S. Cl.
CPC ................ *F02C 7/14* (2013.01); *F01D 25/18* (2013.01); *F02C 7/18* (2013.01); *F02C 7/06* (2013.01);
(Continued)

(58) Field of Classification Search
CPC ...... F02C 7/14; F02C 7/18; F02C 7/06; F02C 7/20; F02C 7/32; F01D 25/18;
(Continued)

(56) References Cited

U.S. PATENT DOCUMENTS 2,249,948 A * 7/1941 Dornier ................. B64D 33/12
165/44
8,776,952 B2 * 7/2014 Schwarz ................... F02C 7/14
184/104.1
(Continued)

FOREIGN PATENT DOCUMENTS

| EP | 3 115 588 A1 | 1/2017 |
|----|--------------|--------|
| FR | 3 029 171 A1 | 6/2016 |
| FR | 3 046 200 A1 | 6/2017 |

OTHER PUBLICATIONS

International Search Report dated Mar. 6, 2020 in PCT/FR2019/052743 filed on Nov. 19, 2019, 3 pages.
(Continued)

*Primary Examiner* — Gerald L Sung
*Assistant Examiner* — Rene D Ford
(74) *Attorney, Agent, or Firm* — Oblon, McClelland, Maier & Neustadt, L.L.P.

(57) ABSTRACT

An engine assembly for an aircraft including a bypass turbomachine as well as a turbomachine attachment pylon including an air-oil exchanger system arranged in an inter-ducts compartment between the flow ducts, the compartment being delimited radially on the outside by an inter-ducts cowling, the exchanger system being supplied with air from
(Continued)

a secondary flow duct of the turbomachine delimited radially on the inside by the inter-ducts cowling, and the exchanger system being supported by a support arranged in the inter-ducts compartment, this support being mechanically connected to the attachment pylon by connecting means passing through the inter-ducts cowling.

10 Claims, 4 Drawing Sheets

(51) Int. Cl.
*F02C 7/18* (2006.01)
*F02C 7/20* (2006.01)
*F02C 7/06* (2006.01)

(52) U.S. Cl.
CPC .......... *F02C 7/20* (2013.01); *F05D 2220/323* (2013.01); *F05D 2240/90* (2013.01); *F05D 2260/213* (2013.01); *F05D 2260/98* (2013.01)

(58) Field of Classification Search
CPC ............... F01D 25/12; F05D 2220/323; F05D 2240/90; F05D 2260/213; F05D 2260/98; Y02T 50/60; F16N 2210/02; F16N 39/02; F01M 5/002
See application file for complete search history.

(56) References Cited

U.S. PATENT DOCUMENTS

| | | | |
|---|---|---|---|
| 2007/0215326 A1 | 9/2007 | Schwarz et al. | |
| 2008/0006022 A1* | 1/2008 | Schwarz | F02K 3/115 60/204 |
| 2008/0028763 A1 | 2/2008 | Schwarz et al. | |
| 2008/0230651 A1* | 9/2008 | Porte | F01D 9/065 60/785 |
| 2009/0188232 A1* | 7/2009 | Suciu | B64D 27/18 60/785 |
| 2012/0060466 A1 | 3/2012 | Schwarz et al. | |
| 2014/0216056 A1 | 8/2014 | Schwarz et al. | |
| 2015/0308340 A1 | 10/2015 | Tateiwa | |
| 2016/0138471 A1* | 5/2016 | Van Der Woude | F01D 25/24 415/144 |
| 2016/0153309 A1 | 6/2016 | Clairet et al. | |
| 2017/0009657 A1 | 1/2017 | Schwarz et al. | |
| 2017/0044980 A1* | 2/2017 | Duesler | F02C 7/141 |
| 2017/0122210 A1 | 5/2017 | Schwarz et al. | |
| 2017/0184029 A1* | 6/2017 | Yu | F02C 7/06 |
| 2017/0248077 A9 | 8/2017 | Tateiwa | |
| 2019/0003390 A1* | 1/2019 | Ramos | F02C 7/14 |
| 2019/0218973 A1 | 7/2019 | Schwarz et al. | |
| 2021/0062719 A1* | 3/2021 | Erickson | F02C 7/06 |
| 2021/0071581 A1* | 3/2021 | Sodaro | F02K 3/06 |
| 2021/0086906 A1* | 3/2021 | Hellegouarch | B64D 29/06 |
| 2021/0115852 A1* | 4/2021 | Hellegouarch | F02C 7/32 |

OTHER PUBLICATIONS

French Preliminary Search Report dated Aug. 7, 2019 in French Patent Application No. 18 72249 filed on Dec. 3, 2018 (with translation of category of cited documents), 2 pages.

* cited by examiner

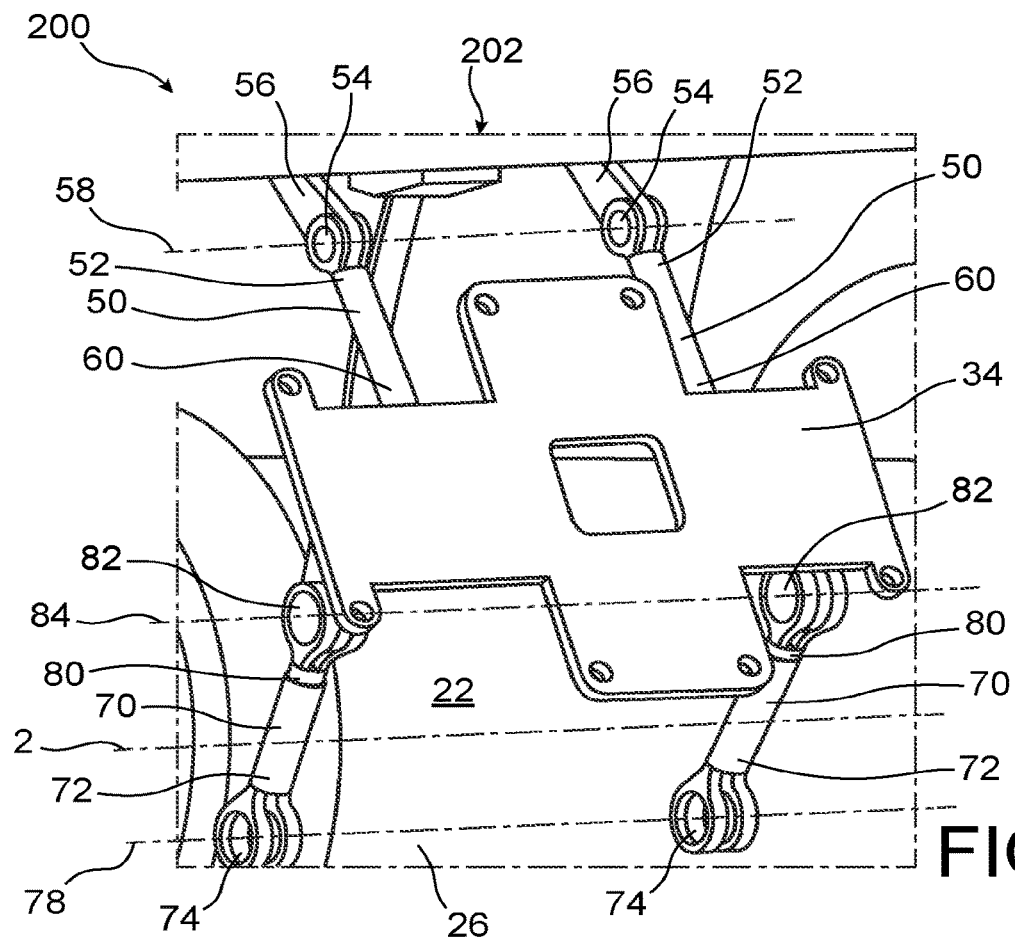
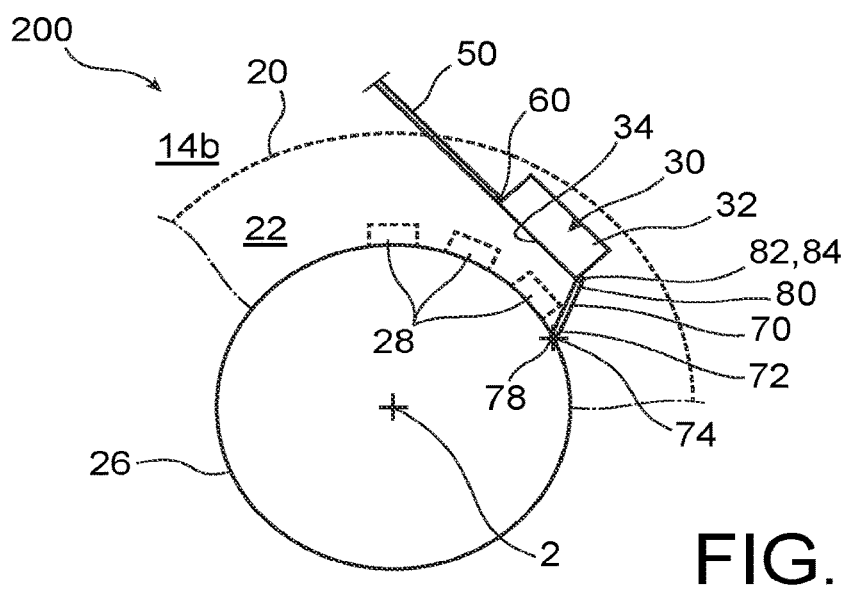

ENGINE ASSEMBLY FOR AN AIRCRAFT
HAVING AN AIR-OIL EXCHANGER SYSTEM
SUPPORT WITH OPTIMIZED
ATTACHMENT

TECHNICAL FIELD

The invention relates to the field of aircraft turbomachines. More specifically, the invention relates to an aircraft engine assembly including a bypass turbomachine equipped with an air-oil exchanger system within its inter-flow compartment.

In particular, the invention applies to a bypass turbojet engine, and even more preferably to a bypass twin-spool turbojet engine.

PRIOR ART

In general, the inter-flow compartment of a bypass turbomachine houses numerous pieces of equipment. In particular, these may include an air-oil exchanger system, whose function is to cool down the lubrication oil of the rotating elements of the turbomachine with air sampled out of the compartment, into the secondary flow path.

The air-oil exchanger system is associated to a support, which is usually linked to the engine casing by connecting means arranged in the inter-flow compartment. These connecting means shall contribute to positioning the exchanger system accurately with respect to the inter-flow cowling delimiting the inter-flow compartment radially outwards. This accurate positioning of the exchanger system arises from the need to make an air intake passage arranged through the inter-flow cowling and an air intake scoop of the exchanger system coincide better.

However, in this arrangement, the inter-flow cowling and the air-oil exchanger system are subjected to different temperatures which could lead to a considerable differential expansion, difficult to combine with the aforementioned accurate positioning need. Indeed, the exchanger system is exposed to heat of the engine casing to which its support is linked, whereas the inter-flow cowling is cooled down by the secondary stream passing through the secondary flow path internally delimited by this same inter-flow cowling.

Consequently, there is still a need to improve the design of existing solutions, so as to improve the accuracy of the relative positioning between the inter-flow cowling and the air-oil exchanger system.

DISCLOSURE OF THE INVENTION

To address this need, an object of the invention is an engine assembly for an aircraft comprising a bypass turbomachine as well as a hooking mast of the turbomachine intended to ensure hooking of the turbomachine on a wing element of the aircraft, the turbomachine comprising an air-oil exchanger system arranged in an inter-flow compartment delimited radially outwards by an inter-flow cowling, the exchanger system being fed with air coming from a secondary flow path of the turbomachine delimited radially inwards by the inter-flow cowling, and the exchanger system being supported by a support arranged in the inter-flow compartment.

According to the invention, the support is mechanically linked to the hooking mast by connecting means crossing the inter-flow cowling.

Thus, the invention drastically departs from prior solutions, by linking the support of the exchanger system to the hooking mast. This allows considerably attenuating the differential thermal expansions between the inter-flow cowling and the assembly formed by the exchanger system and its support. The relative positioning between this exchanger system and the inter-flow cowling is thus advantageously facilitated, as it becomes less dependent on the differential expansion effects.

Moreover, the invention presents at least one of the following optional features, considered separately or in combination.

The connecting means are configured to enable the support to be displaced between an operating position placing the exchanger system inside the inter-flow compartment, preferably so that it radially covers one or several piece(s) of equipment within the inter-flow compartment, and a maintenance position in which this support is further away from a longitudinal central axis of the turbomachine than in the operating position.

Thanks to this possible displacement, access to the exchanger is facilitated during maintenance operations. In this respect, it should be noted that the engine assembly is preferably configured so that the maintenance position is accessible only after removal or opening of the inter-flow cowling.

The connecting means comprise connecting rods hinged at least at their end for connection to the hooking mast. This hinge allows for an easy movement of the support, for example to generate a rotation of this support relative to the mast, or other relative movements such as deformable parallelogram type movements.

The connecting rods are rigidly connected to the support.

The assembly comprises means for holding the support in its operating position.

According to a first possibility, the holding means comprise telescopic holding connecting rods having ends for connection to the support, as well as ends for connection to an engine casing.

According to a second possibility, the holding means comprise a holding axis housed within a first housing orifice provided on the hooking mast, as well as within a second housing orifice provided on a holding portion of the support, the holding axis being held within its associated housing orifices through a cap mounted on the holding portion of the support, and preferably via an elastic biasing means arranged between the cap and the holding axis to urge the latter in the direction of the first housing orifice.

Preferably, the exchanger system comprises at least one air inlet conduit an intake scoop of which cooperates with an air intake passage arranged through the inter-flow cowling.

Preferably, the intake scoop has a controllable air passage section, preferably via a controlled flap movably mounted on the intake scoop, or on the air intake passage provided through the inter-flow cowling.

Other advantages and features of the invention will become apparent in the non-limiting detailed description hereinbelow.

BRIEF DESCRIPTION OF THE DRAWINGS

This description will be made with reference to the appended drawings among which:

FIG. 3a is a perspective view of the portion shown in the previous figure, with the support of the exchanger system arranged in the operating position;

FIG. 3b is a schematic sectional view considered according to a transverse plane of the portion of the turbojet engine shown in the previous figure;

DETAILED DISCLOSURE OF PARTICULAR EMBODIMENTS

Figure 1:
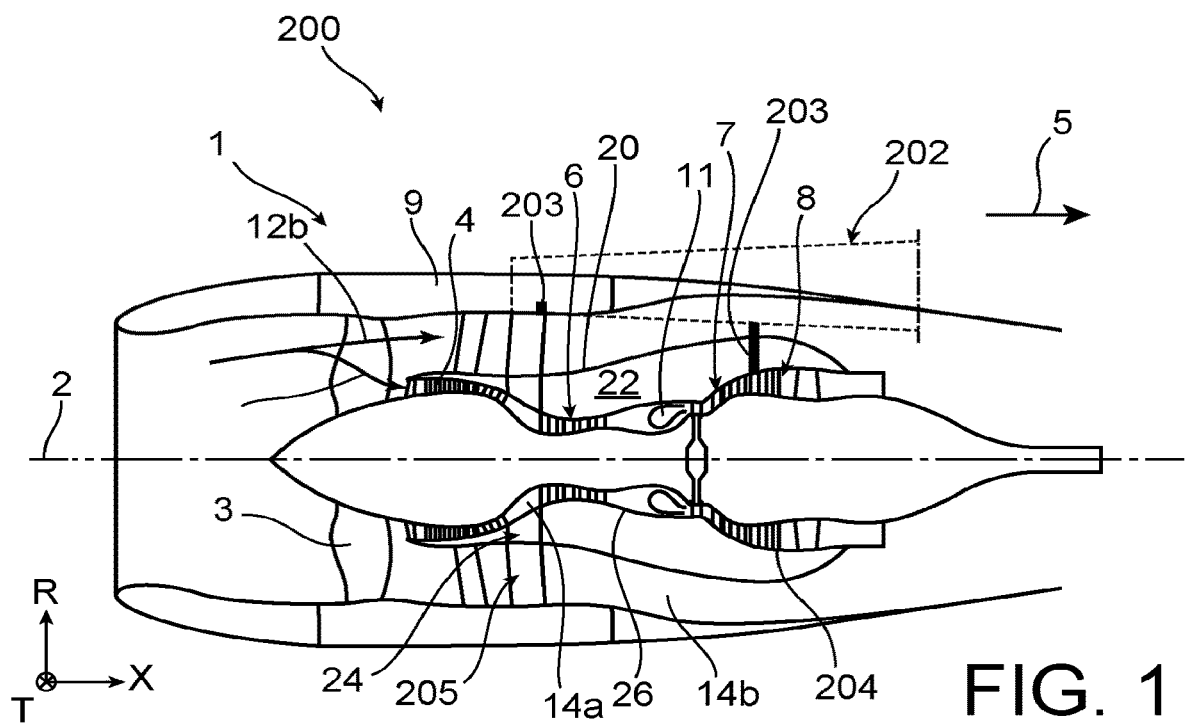
FIG. 1 represents a schematic side view of a bypass turbojet engine according to the invention.

Referring first to FIG. 1, there is represented an aircraft engine assembly 200 comprising a turbojet engine 1, a mast 202 for hooking the turbojet engine, and two suspensions 203 linking the turbojet engine 1 to the mast 202. More specifically, the turbojet engine 1 features a bypass and twin-spool design. It is linked to the mast 202 where only the rigid structure thereof has been schematically represented. This rigid structure, also called primary structure, is intended for taking up the forces originating from the turbojet engine 1. The mast is also equipped with secondary structures (not represented), in the form of aerodynamic fairings. The rigid structure of the mast itself is attached on a structural element of the aircraft, for example under a wingbox to hang the turbojet engine under a wing of the aircraft.

The suspensions 203 serve as the mechanical interface between the turbojet engine 1 and the rigid structure of the hooking mast 202. To complete this interface, there are conventionally provided thrust take-up connecting rods (not represented), for example linking an intermediate casing 205 of the turbojet engine, to the rear suspension 203. For example, the front suspension 203 links an upper portion of the intermediate casing 205 to a front end of the mast 202, whereas the rear suspension links, for example, an inter-turbine casing 204 to the mast 202.

The turbomachine 1 has a longitudinal central axis 2 around which its different components extend. It comprises, from upstream to downstream according to a main direction 5 of the gases flow through this turbomachine, a fan 3, a low-pressure compressor 4, a high-pressure compressor 6, a combustion chamber 11, a high-pressure turbine 7 and a low-pressure turbine 8.

Conventionally, after having passed through the fan, air is split into a central primary stream 12a and a secondary stream 12b which surrounds the primary stream. The primary stream 12a flows within a main flow path 14a for the circulation of the gases passing through the compressors 4, 6, the combustion chamber 11 and the turbines 7, 8. In turn, the secondary stream 12b flows within a secondary flow path 14b delimited radially outwards by an engine casing, surrounded by a nacelle 9.

The secondary flow path 14b is also delimited radially inwards by an inter-flow cowling 20, also called IFS (standing for "Inner Fan Structure") cowling. In general, this cowling 20 is removably mounted around the engine casing 26, or displaceable between a closed position and an open position, for example by pivoting. The inter-flow cowling 20 also fills the function of external radial delimitation of an inter-flow compartment 22, itself internally delimited by the engine casing. The inter-flow compartment 22 is delimited upwards by a hub 24 of the intermediate casing 205, with the cowling 20 fitting in the downstream continuity of an external shroud of this intermediate casing.

Figure 2:
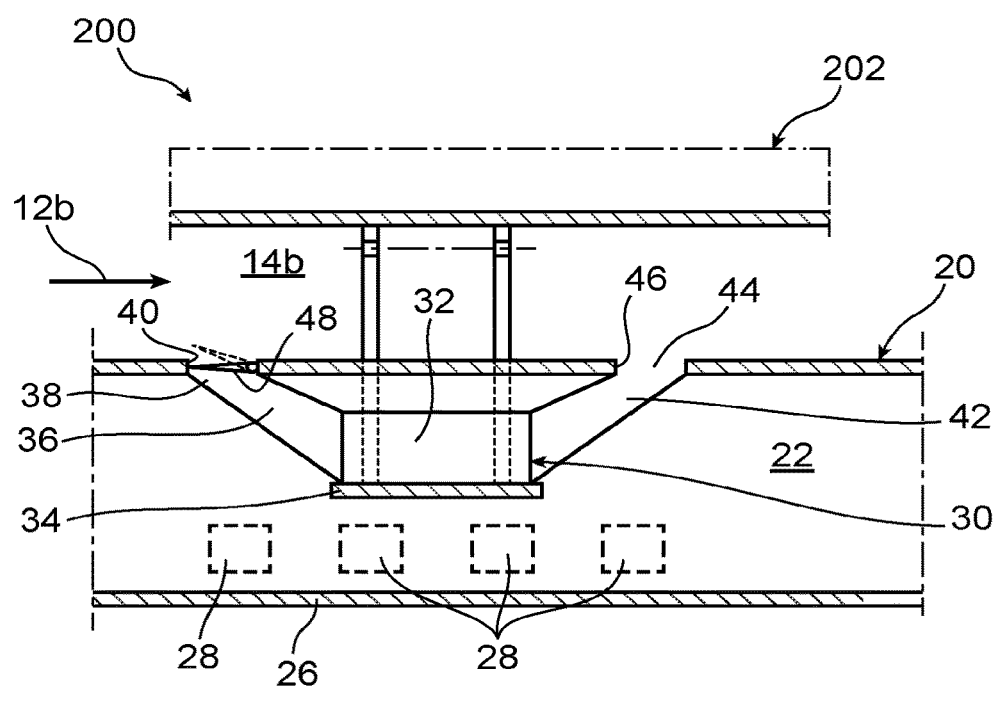
FIG. 2 represents a schematic sectional view of a portion of the turbojet engine shown in the previous figure, showing an air-oil exchanger system.

As schematized in FIG. 2, the inter-flow compartment 22 houses numerous pieces of equipment 28 attached on the engine casing 26, and also an air-oil exchanger system 30 arranged proximate to the inter-flow cowling 20. The system 30 allows cooling down oil having served in the lubrication of rotating portions of the turbojet engine, such as bearings and gears. This cooling is achieved with air sampled in the secondary flow path 14b. More specifically, the exchanger system 30 includes an exchanger core 32 supported by a support 34, as well as an inlet conduit 36 one end of which is connected to the exchanger core 32 The other end of this conduit 36 forms an air intake scoop 38, which cooperates with an air intake passage 40 crossing the inter-flow cowling 20. Preferably, the scoop 38 is arranged in a flush manner in the passage 40, as schematized in FIG. 2. Thus, part of the fresh air circulating in the secondary flow path 14b can be sucked and circulate in the conduit 36, before joining the exchanger core 32.

The amount of air sampled into the flow path may be regulated in any manner known to those skilled in the art, to adapt to the oil cooling need. As example, the intake scoop 38 may have a controllable air passage section, via a controlled flap 48 movably mounted on this intake scoop. The passage section evolves according to the opening angle of the flap 48, thereby conditioning the sampled air amount. Alternatively, the flap 48 may be movably mounted on the air intake passage 40 which coincides with the scoop, still leading to a variation of the air passage section of this scoop.

After having cooled down the oil in the core, air is extracted from the latter through a discharge conduit 42 one end 44 of which cooperates with an air discharge passage 46, formed through the inter-flow cowling 20. Thus, air can join the secondary flow path 14b, further downwards.

The support 34 is mechanically linked to the mast 202 by connecting means that are specific to the present invention. In the first embodiment shown in FIGS. 2 to 4b, these connecting means are in the form of two substantially parallel connecting rods 50. Each connecting rod 50 has one end 52 for connection to the mast 202, via a hinge connection 54 preferably equipped with a ball-joint. Preferably, the hinge connection 54 is performed at the end of an arm 56 secured to a lower spar of the hooking mast 202. The two hinge connections 54, axially spaced apart from one another, together form coaxial hinges about an axis 58 parallel to the longitudinal central axis 2 of the turbojet engine. Of course, the number of these connecting rods 50 may be more than two. At the opposite end of each connecting rod, that is to say at one end 60, the latter is connected, preferably fixedly/rigidly, to the support 34. Therefore, the presence of the hinges with the axis 58 enables a rotation about this same axis of the assembly formed by the connecting rods 50, the support 34, and the exchanger system 30. It should be noted that, optionally, at least one of these connecting rods 50 may be telescopic over a very limited travel, typically in the range of one millimeter to a few millimeters. This enables an accurate adjustment of the position of the support 34 within the inter-flow compartment 22, with respect to the flow path cowling 20. This telescopic feature of a connecting rod may be obtained through a simple sliding mounting of the connecting rod on its hinge forming the hinge connection 54.

In particular, it may allow adjusting the axial alignment of the support 34 parallel to the engine axis.

From its end 60, each connecting rod 50 extends in the compartment 22 before crossing the inter-flow cowling 20, and then extends through a portion of the secondary flow path 14b up to its end 52 for connection to the mast.

FIGS. 2, 3a, 3b show the assembly 200 in a configuration as adopted in flight. In this configuration, the exchanger system 30 is located in the inter-flow compartment 22, with its support 34 arranged in an operating position in which it radially covers one or several other piece(s) of equipment 28 of the compartment 22. This position is held not only by the presence of the above-described connecting rods 50, but also thanks to specific holding means of the support 34, which will now be described.

In this preferred embodiment, the means for holding the support 34 in its operating position comprise two holding connecting rods 70. Each connecting rod 70 has one end 72 for connection to the engine casing 26, via a hinge connection 74 preferably equipped with a ball-joint. The two hinge connections 74, axially spaced apart from one another, together form coaxial hinges about an axis 78 parallel to the longitudinal central axis 2 of the turbojet engine. Of course, the number of these connecting rods 70 may be more than two. At the opposite end of each connecting rod, that is to say at one end 80, the latter is connected to the support 34 also via a hinge connection 82, preferably equipped with a ball-joint. The two hinge connections 82, axially spaced apart from one another, together form coaxial hinges about an axis 84 parallel to the longitudinal central axis 2 of the turbojet engine.

Figure 4A:
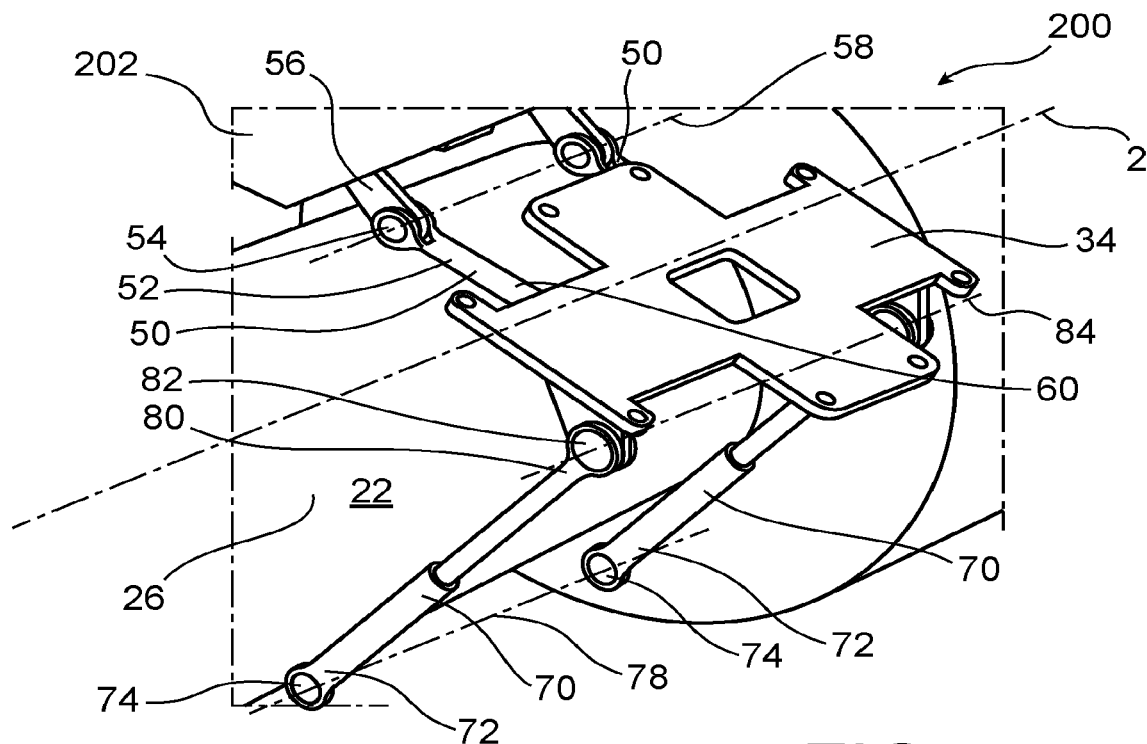
FIG. 4a is a view similar to that of FIG. 3a, with the support of the exchanger system arranged in the maintenance position.
Figure 4B:
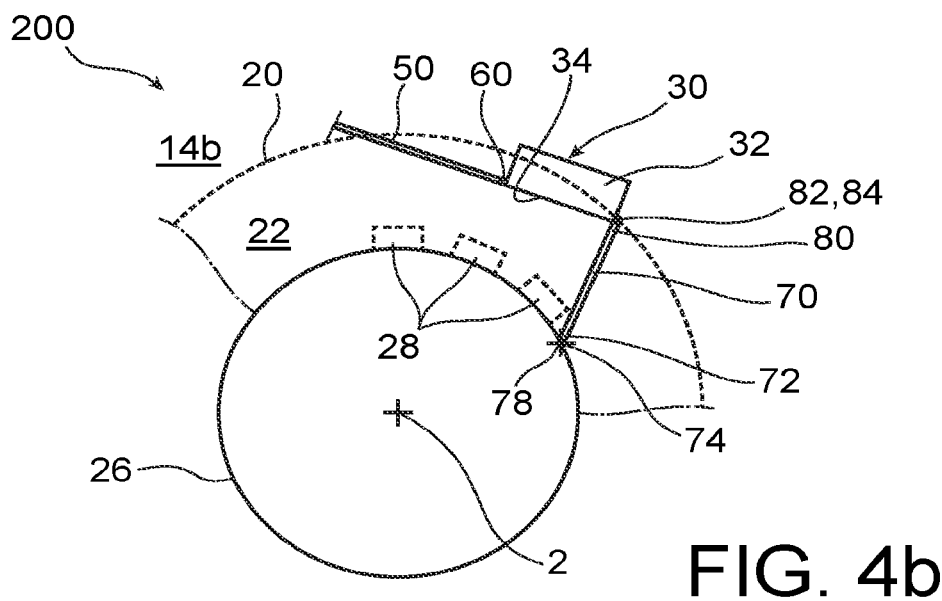
FIG. 4b is a schematic sectional view considered according to a transverse plane of the portion of the turbojet engine shown in the previous figure.

Thus, the holding connecting rods 70 may serve in holding the support 34 in its operating position, and in a preferred embodiment, they may also be telescopic so as to enable a displacement of this support 34 from its operating position, into a maintenance position shown in FIGS. 4a and 4b. In this maintenance position, obtained by extension of the connecting rods 70 resulting in a rotation of the support 34 about the hinge axis 58, this support is further away from the longitudinal central axis 2 than in the operating position. This rotation of the support 34 about the hinge axis 58 is enabled by the rotation of the holding connecting rods 70 about each of the hinge axes 78, 84. Thus, the connecting rods 70 form cylinder-type actuators for the displacement of the support 34. Alternatively, one or several actuator(s) may be adjoined between the support 34 and the engine casing 26, so that the extension/the retraction of the connecting rods 70 follows the movement of these actuators.

To a certain extent, the maintenance position of the support 34 allows bringing the latter in an orientation that is more horizontal and further from the engine casing 26, thereby facilitating the intervention of operators on the exchanger system 30. Besides, as schematized in FIG. 4b, the shift between the operating position and the maintenance position is such that the latter turns out to be accessible only after the inter-flow cowling 22 has been removed, or brought into the opening position. In other words, this maintenance position can be reached only if the cowling 22 has been opened or removed beforehand, which operation is conventionally carried out before any maintenance intervention on the equipment 28, 30.

Figure 5:
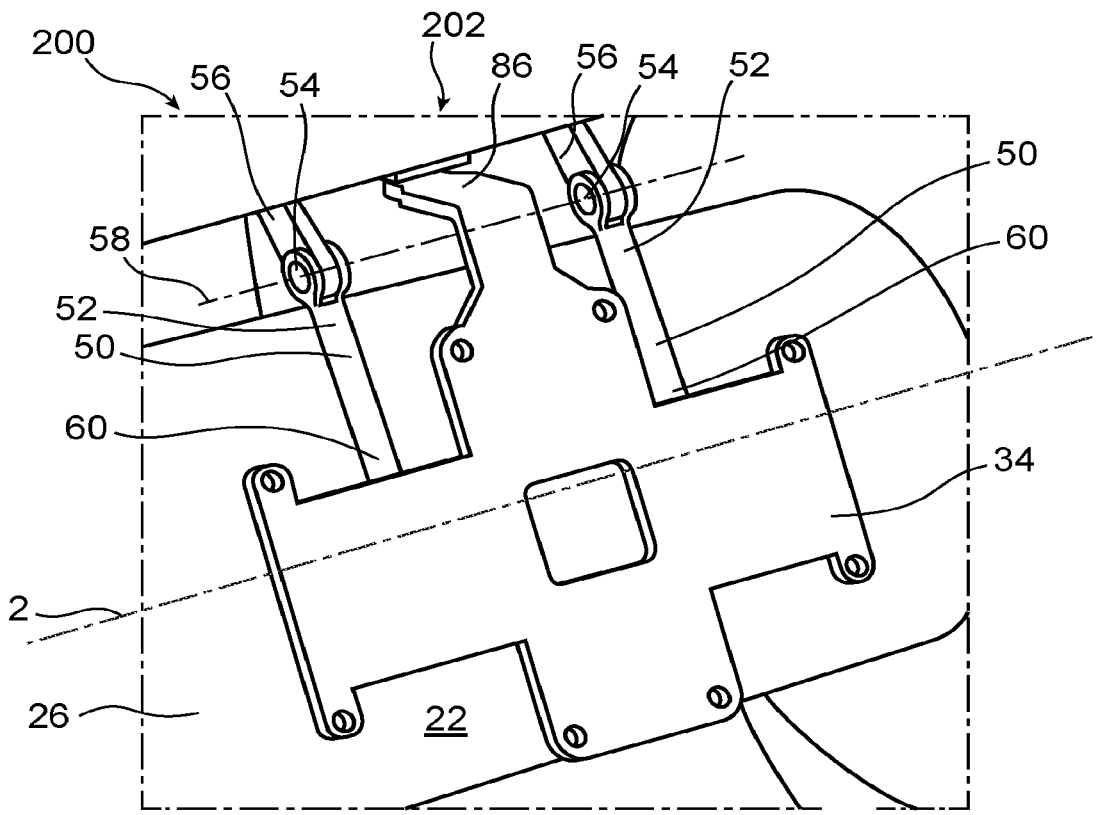
FIG. 5 is a perspective view similar to that of FIG. 3a, with the support of the exchanger system according to another preferred embodiment of the invention.
Figure 6:
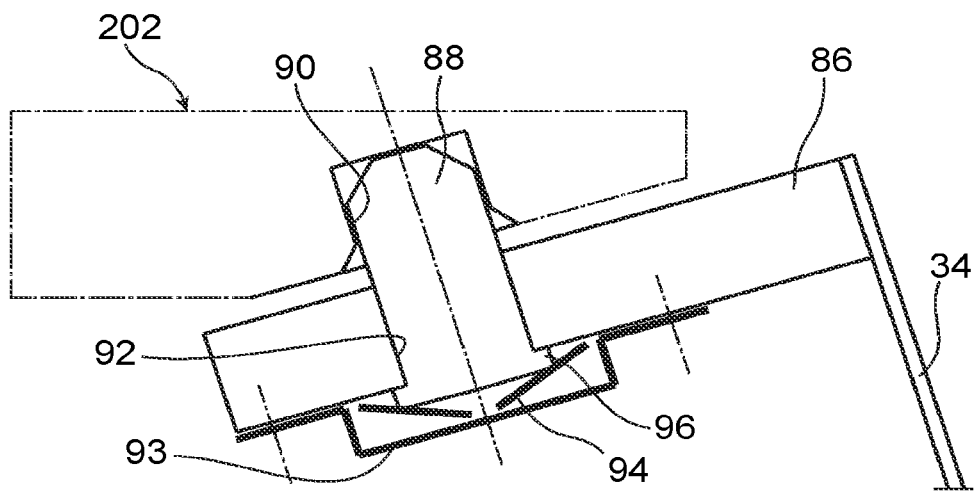
FIG. 6 is a cross-sectional view of a portion of the turbojet engine shown in the previous figure.

According to another preferred embodiment represented in FIGS. 5 and 6, the holding connecting rods are no longer necessary, and they are replaced with other holding means which will now be described.

These firstly consist of a locking finger 86 secured to the support 34 and inclined with respect to the latter, for example by an angle close to 90°. Thus, this finger 86 forms a holding portion of the support, as it cooperates with a holding axis 88. The end of this pin-like shaped holding axis 88 is housed within a first open-through housing orifice 90, provided in the mast 202. The holding axis 88 crosses a second housing orifice 92 formed through the finger 86, the latter being substantially parallel to the portion of the mast in which the first housing orifice 90 is formed. Preferably, a collar 96 is provided at the end of the holding axis 88, to hold it bearing against the finger 86 around the second orifice 92. To keep this position of the finger 86 ensuring holding of the support 34 in its operating position, a cap 93 is mounted screwed on the opposite surface of the finger 86. A washer 94 forming an elastic biasing means is then arranged between the cap 96 and the holding axis 88, to urge the latter in the direction of the first housing orifice 90, and press the collar 96 against the locking finger 86.

For mounting, the support 34 is first brought into its operating position, in which the two housing orifices 90, 92 are aligned. The holding axis 88 is then inserted, and then the washer 96 is set in place before assembly of the cap 93 by screwing on the locking finger 86. When these holding means are dismounted, the passage of the support 34 from its operating position into its maintenance position may be carried out manually by the operator, or be caused automatically by a displacement of the inter-flow cowling 20 towards its open position.

Of course, various modifications may be brought by those skilled in the art to the invention that has just been described only as non-limiting examples and within the extent defined by the appended claims.

The invention claimed is:

1. An engine assembly for an aircraft comprising a bypass turbomachine as well as a hooking mast of the turbomachine configured to ensure hooking of the turbomachine on a wing element of the aircraft, the turbomachine comprising an air-oil exchanger system arranged in an inter-flow compartment delimited radially outwards by an inter-flow cowling, the exchanger system being fed with air coming from a secondary flow path of the turbomachine delimited radially inwards by the inter-flow cowling, and the exchanger system being supported by a support arranged in the inter-flow compartment,
wherein said support is mechanically linked to the hooking mast by connecting means crossing the inter-flow cowling.

2. The engine assembly according to claim 1, wherein the connecting means are configured to enable the support to be displaced between an operating position placing the exchanger system inside the inter-flow compartment, so that it radially covers one or several piece(s) of equipment within the inter-flow compartment, and a maintenance position wherein said support is further away from a longitudinal central axis of the turbomachine than in the operating position.

3. The engine assembly according to claim 2, wherein the engine assembly is configured so that the maintenance position is accessible only after removal or opening of the inter-flow cowling.

4. The engine assembly according to claim 2, further comprising means for holding the support in its operating position.

5. The engine assembly according to claim 4, wherein the holding means comprise telescopic holding connecting rods having ends for connection to the support, as well as ends for connection to an engine casing.

6. The engine assembly according to claim 4, wherein the holding means comprise a holding axis housed within a first housing orifice provided on the hooking mast, as well as within a second housing orifice provided on a holding portion of the support, the holding axis being held within its associated housing orifices through a cap mounted on the holding portion of the support, and via an elastic biasing means arranged between the cap and the holding axis to urge the latter in the direction of the first housing orifice.

7. The engine assembly according to claim 1, wherein the connecting means comprise connecting rods hinged at least at their end for connection to the hooking mast.

8. The engine assembly according to claim 7, wherein the connecting rods are rigidly connected to the support.

9. The engine assembly according to claim 1, wherein the exchanger system comprises at least one air inlet conduit an intake scoop of which cooperates with an air intake passage arranged through the inter-flow cowling.

10. The engine assembly according to claim 9, wherein the intake scoop has a controllable air passage section, via a controlled flap movably mounted on the intake scoop, or on the air intake passage provided through the inter-flow cowling.

* * * * *